Patented May 30, 1950

2,509,772

UNITED STATES PATENT OFFICE 2,509,772

METHOD OF PREPARING CHLORO-ARYLOXY ACETIC ACIDS

Joseph M. F. Leaper, Ambler, Pa., assignor to American Chemical Paint Company, Ambler, Pa., a corporation of Delaware No Drawing. Application April 26, 1946, Serial No. 665,333

2 Claims. (Cl. 260—521)

The invention of this application relates to methods for making aryloxy-monocarboxylic acids. Stated more particularly, the invention concerns itself with a wholly new method of purifying and separating aryloxy-monocarboxylic acids from mixtures of these acids and the corresponding phenols or naphthols, which are obtained in the usual methods of manufacture.

The aryloxy-monocarboxylic acids may be represented by the formula: $R.O.(CH_2)x.COOH$, where R is a phenyl or naphthyl group, which may be either substituted or unsubstituted, and X is an integer. The substituents may be one or more of the elements or groups: halogen, alkyl, alkoxy, aryl, amino, nitro, etc. or a combination thereof.

These compounds are made by reacting the corresponding phenol or naphthol (R.OH) with the sodium or other salt of the appropriate halogenated fatty acid, $Y.(CH_2)x.COOH$, where Y is halogen, in an aqueous medium or with the addition of a solvent such as methyl or ethyl alcohol, in the presence of an alkali such as sodium hydroxide.

In the present disclosure, the term "phenol or naphthol" is used to include both the substituted and unsubstituted phenols or naphthols or mixtures thereof. Hereinafter, the word "phenol" will be used wherever the context permits to mean both naphthol, substituted or unsubstituted, as well as phenol, substituted or unsubstituted. The aryloxy-monocarboxylic acids will for convenience be referred to as "aryloxy acids."

The reaction by which the aryloxy acids are made may be represented by the following equation:

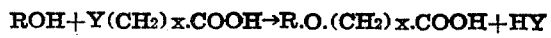

$ROH + Y(CH_2)x.COOH \rightarrow R.O.(CH_2)x.COOH + HY$

The end products of the reaction are the sodium or other salt of the desired aryloxy acid and the sodium or other salt of the halogen present in the halogen fatty acid used.

Under practically all conditions, however, the reactions are incomplete, and when the reaction mixture is acidified for the purpose of separating the desired aryloxy acid, the resulting product is always contaminated with varying amounts of the unreacted phenol or naphthol used.

The aryloxy acids have important uses in the agricultural and horticultural fields, and for these applications they are generally freed of the unreacted phenols. These materials may be removed, in some cases, by resort to steam distillation. This method is expensive and time-consuming, particularly in the case of phenols and naphthols of low vapor pressure. Purification may also be effected by repeated crystallization from a hot solvent. The latter method also has the disadvantages of inefficiency and slowness, and furthermore requires the working up of mother liquors and the recovery of solvents.

The primary purpose of the present invention is to provide a relatively simple and inexpensive method of purifying and separating the aryloxy acids from reaction mixtures containing the above mentioned impurities, a method which is free of the disadvantages of prior methods of accomplishing this purpose.

Briefly stated, the method of the invention consists in melting the crude reaction mixture containing aryloxy acid and unreacted phenol, and allowing it to run in a thin stream into a selective solvent for the phenol.

By the term "selective solvent for the phenol" is meant a substance which is a very good solvent for the phenol, but which is a very poor solvent for aryloxy acid. The following are the criteria, which dictate the choice of a suitable selective solvent:

(1) The selective solvent should be a very good solvent for the particular phenol used in the process. For practical purposes, the solvent should dissolve at least 20%, and preferably 30%, of its weight of the phenol.

(2) The selective solvent should be a poor solvent for aryloxy acid, and should preferably not dissolve more than 1% of its weight of the acid.

(3) The selective solvent should be a poor solvent for alkali.

(4) The selective solvent should be capable of readily giving up the dissolved phenol.

(5) The selective solvent should be substantially immiscible with water.

(6) The selective solvent need not necessarily be volatile.

There are relatively few solvents which are suitable for the purposes of this invention. The solvents, which I found most suitable are any of the petroleum distillates, particularly, but not necessarily, the chain hydrocarbons boiling between about 140° C. and 280° C. As specific examples may be mentioned kerosene, gasoline, Diesel oil, etc. These solvents not only meet the use requirements above set forth, but also have the great advantage of being readily available and very inexpensive.

The following procedure is given by way of example:

1056 pounds of 2.4-dichlorphenol and a solution containing 756 pounds of caustic soda and 160 gallons of water are placed in jacketed steel kettle (750 gallon capacity), and agitated until all is in solution. Then 567 pounds of monochloracetic acid are added, and the mixture is agitated and heated until it is evaporated to dryness. The contents of the kettle are then dissolved in hot water, transferred to an acid-proof tank, acidified with hydrochloric acid, and heated to boiling.

The crude 2.4-dichlorphenoxy acetic acid is allowed to separate in liquid form at the bottom of the tank, and then run in a very thin stream into 500 gallons of kerosene, with constant and vigorous stirring of the kerosene. The globules of crude melted aryloxy acid as they fall into the kerosene solidify and assume a fine granular form.

The resultant slurry, is allowed to cool, is then centrifuged, washed with more kerosene on a suitable filter, and finally dried in any desired or conventional manner.

The purified aryloxy acid is at least 99% pure and has no odor of 2.4-dichlorphenol.

The kerosene solution of phenol is extracted with an aqueous caustic soda solution. The caustic soda solution of phenol is acidified, and the separated phenol is acidified and reused in the process of making the aryloxy acid. The kerosene is reused in the separation of aryloxy acid in the next batch.

In a similar manner, the substituted or unsubstituted phenoxy or naphthoxy aliphatic acids (e. g. acetic or higher homologue) made by reacting chlorinated aliphatic acid with ortho or para monochlorphenols, 2.4.5 or 2.4.6-trichlorphenols, 2-chloro-5-hydroxy-toluene, 2.4-dimethyl phenol, 3.4-dimethyl phenol, 3.5-dimethyl phenol, 2-chloro-4-methyl phenol, 2-chloro-4-phenyl phenol, para chlor-thymol, alpha or beta naphthol may be purified, using kerosene or any of the other selective solvents.

I claim:

1. The method of separating a chlorphenoxy acetic acid from an admixture of said acid with a chlorphenol, which consists in melting the admixture and running it into kerosene in a thin stream to selectively dissolve out the chlorphenol.

2. The method of separating 2.4-dichlorphenoxy acetic acid from dichlorphenol in an admixture of said substances, which consists in melting the admixture and running it into kerosene in a thin stream to selectively dissolve out the dichlorphenol.

JOSEPH M. F. LEAPER.

REFERENCES CITED

The following references are of record in the file of this patent:

UNITED STATES PATENTS

| Number | Name | Date |
|---|---|---|
| 2,252,665 | Reiff et al. | Aug. 12, 1941 |
| 2,321,036 | Luten et al. | June 8, 1943 |
| 2,327,312 | Luten et al. | Aug. 17, 1943 |
| 2,343,165 | Adler | Feb. 29, 1944 |
| 2,357,252 | Berger et al. | Aug. 29, 1944 |

OTHER REFERENCES

Pokorney, J. Am. Chem. Soc., 63, page 1678 (1941).

Ennis et al., Science, vol. 103, page 476 (1946).